US010200120B2

(12) United States Patent
Liu et al.

(10) Patent No.: US 10,200,120 B2
(45) Date of Patent: Feb. 5, 2019

(54) SIGNAL ENCODING AND DECODING METHOD, DEVICE AND SYSTEM

(71) Applicant: KUANG-CHI INTELLIGENT PHOTONIC TECHNOLOGY LTD., Shenzhen (CN)

(72) Inventors: Ruopeng Liu, Shenzhen (CN); Linyong Fan, Shenzhen (CN)

(73) Assignee: KUANG-CHI INTELLIGENT PHOTONIC TECHNOLOGY LTD., Shenzhen (CN)

(*) Notice: Subject to any disclaimer, the term of this patent is extended or adjusted under 35 U.S.C. 154(b) by 0 days.

(21) Appl. No.: 15/449,981

(22) Filed: Mar. 5, 2017

(65) Prior Publication Data
US 2017/0180043 A1 Jun. 22, 2017

Related U.S. Application Data

(63) Continuation of application No. PCT/CN2015/086847, filed on Aug. 13, 2017.

(30) Foreign Application Priority Data

Sep. 5, 2014 (CN) .......................... 2014 1 0453403

(51) Int. Cl.
H04B 17/00 (2015.01)
H04B 10/079 (2013.01)
(Continued)

(52) U.S. Cl.
CPC .......... H04B 10/0795 (2013.01); G06K 7/00 (2013.01); H04B 10/11 (2013.01); H04B 10/502 (2013.01);
(Continued)

(58) Field of Classification Search
CPC .. H04B 10/0795; H04B 10/11; H04B 10/502; H04B 10/524; H04B 10/695; H04B 11/00; G06K 7/00; H04L 25/4902
See application file for complete search history.

(56) References Cited

U.S. PATENT DOCUMENTS 8,767,814 B2 * 7/2014 Schuberth ........... H04L 25/4902
332/109
2004/0174933 A1 9/2004 Lei
(Continued)

FOREIGN PATENT DOCUMENTS

CN 1496005 A 5/2004
CN 102799840 A 11/2012
(Continued)

OTHER PUBLICATIONS

Supplementary European Search Report dated May 4, 2018 for EP Patent Application No. EP 15838412.3.

*Primary Examiner* — Tesfaldet Bocure
(74) *Attorney, Agent, or Firm* — Perkins Coie LLP

(57) ABSTRACT

The present application relates to a wireless signal decoding method, which is used to decode an electric signal converted from a wireless signal, where the decoding method includes the following steps: recording a duration of each level of the electric signal; calculating an average value of m maximum durations and an average value of n minimum durations, where m and n are positive integers and are determined by referring to a distribution percentage value of first binary bit values and a distribution percentage value of second binary bit values in data respectively; calculating a decision duration according to the first average value and the second average value; comparing the duration of each level with the decision duration, and according to a comparison result, determining a binary bit value represented by the level; and integrating all binary bit values to restore the data represented by the electric signal.

17 Claims, 7 Drawing Sheets

(51) Int. Cl.
    *G06K 7/00*           (2006.01)
    *H04B 10/11*         (2013.01)
    *H04B 10/50*         (2013.01)
    *H04B 10/524*      (2013.01)
    *H04B 10/69*         (2013.01)
    *H04B 11/00*         (2006.01)
    *H04L 25/49*         (2006.01)

(52) U.S. Cl.
    CPC ......... *H04B 10/524* (2013.01); *H04B 10/695* (2013.01); *H04B 11/00* (2013.01); *H04L 25/4902* (2013.01)

(56) References Cited

U.S. PATENT DOCUMENTS

| | | | |
|---|---|---|---|
| 2012/0250746 A1 | 10/2012 | Sonntag | |
| 2014/0161442 A1* | 6/2014 | Yang | H04B 10/524 398/23 |
| 2017/0187457 A1* | 6/2017 | Liu | H04B 10/116 |

FOREIGN PATENT DOCUMENTS

| | | | |
|---|---|---|---|
| CN | 103378923 | A | 10/2013 |
| CN | 103812557 | A | 5/2014 |
| CN | 104268753 | A | 1/2015 |
| JP | 49-120571 | A | 11/1974 |
| KR | 20070048898 | A | 5/2007 |
| WO | 8806819 | A1 | 9/1988 |

\* cited by examiner

SIGNAL ENCODING AND DECODING METHOD, DEVICE AND SYSTEM

CROSS REFERENCE TO RELATED APPLICATIONS

This application is a continuation of PCT Application No. PCT/CN2015/086847 filed on Aug. 13, 2015, which claims priority to Chinese patent application No. 201410453403.1 of Sep. 5, 2014, both of which are incorporated herein by reference.

TECHNICAL FIELD

The present application relates to the communications field, and in particular, to signal encoding and decoding methods, a device and a system.

BACKGROUND

Wireless optical communication is a short-distance high-speed wireless optical communications technology that is developed based on a light emitting diode (LED) technology. A basic principle of wireless optical communication is to use frequent flash of an LED light source to communicate by virtue of a characteristic that an LED lamp switches faster than a fluorescent lamp and an incandescent lamp. In short, light represents binary 1, and absence of light represents binary 0. After a high-speed optical signal that includes digital information undergoes optical-to-electric conversion, information can be obtained. In the wireless optical communications technology, data is hardly interfered with or captured, and an optical communications device is easily producible but is not easy to damage or degauss, and therefore, may be used to make a wireless optical encryption key. Compared with microwave technologies, the wireless optical communication has relatively rich spectrum resources, which is incomparable with general microwave communication and wireless communication. In addition, the wireless optical communication is compatible with any communications protocol and applicable to any environment. In terms of security, compared with conventional magnetic materials, the wireless optical communication is free from a degaussing problem, without any need to worry about theft of communication content. A wireless optical communications device is flexible, portable, cost-efficient, and suitable for massive popularized application.

With rapid popularization of wireless optical communication, a technology of sending a wireless optical signal by using an LED lamp of a portable electronic device such as a mobile phone has been proposed. When the LED lamp in the portable electronic device is turned on or off, an on duration or an off duration changes randomly, but the duration may be controlled within a specific range. Therefore, a wireless optical signal that represents data information may be sent by the LED lamp of the terminal by using a specially set encoding mode.

However, on one hand, because brightness duration and dimness duration of an optical signal sent by the LED lamp of the portable electronic device change randomly, a recognition ratio of the optical signal is relatively low. On the other hand, strobe features of LED lamps of different electronic devices are different, and a value range of a receiving parameter that is set on at a receive end of light is largely widened to adapt to a transmit end, which reduces performance of some portable electronic devices with excellent strobe features in order to adapt to the receiving parameter. Even so, there are still portable electronic devices that mismatch the parameter, and their signal recognition ratio is still relatively low. Moreover, when the parameter of the optical signal sent by the LED lamp changes, the receive end needs upgrading, which makes system upgrade and maintenance become very complicated.

Technical Problem

In the prior art, a receive end of light recognizes an optical signal sent by an LED lamp of a portable electronic device at a low recognition ratio, and system upgrade and maintenance of the receive end of light are complicated.

Technical Solution

To resolve the foregoing technical problem, a wireless signal encoding and decoding method is proposed as a technical solution in the present application, including the following steps: encoding, at a transmit end, a first binary bit value in data into a level that lasts for a first duration, and encoding a second binary bit value in the data into a level that lasts for a second duration, where levels are separated by delimiters, and the first duration is unequal to the second duration; converting an encoded electric signal into a wireless signal at the transmit end; receiving the wireless signal at a receive end, and converting the wireless signal into an electric signal; decoding the electric signal at the receive end in the following manner: recording a duration of each level of the electric signal; calculating a first average value Ta of m maximum durations and a second average value Tb of n minimum durations, where m and n are positive integers and are determined by referring to a distribution percentage value of first binary bit values and a distribution percentage value of second binary bit values in the data respectively; calculating a decision duration Td according to the first average value and the second average value; comparing the duration of each level with the decision duration, and according to a comparison result, determining a binary bit value represented by the level; and integrating all binary bit values to restore the data.

The present application further proposes a wireless signal decoding method, which is used to decode an electric signal converted from a wireless signal, where the decoding method includes the following steps: recording a duration of each level of the electric signal; calculating a first average value Ta of m maximum durations and a second average value Tb of n minimum durations, where m and n are positive integers and are determined by referring to a distribution percentage value of first binary bit values and a distribution percentage value of second binary bit values in the data respectively; calculating a decision duration Td according to the first average value and the second average value; comparing the duration of each level with the decision duration, and according to a comparison result, determining a binary bit value represented by the level; and integrating all binary bit values to restore the data represented by the electric signal.

The present application further proposes a signal decoding device, which is configured to decode an electric signal converted from a wireless signal, where the decoding device includes: a module configured to record a duration of each level of the electric signal; a module configured to calculate an average value of m maximum durations and an average value of n minimum durations, where m and n are positive integers and are determined by referring to a distribution percentage value of first binary bit values and a distribution percentage value of second binary bit values in the data respectively; a module configured to calculate a decision duration according to the first average value and the second average value; a module configured to compare the duration of each level with the decision duration, and according to a comparison result, determine a binary bit value represented by the level; and a module configured to integrate all binary bit values to restore the data represented by the electric signal.

The present application further proposes a receive end, including a decoding device described above.

The present application further proposes a communications system, including a transmit end, where the transmit end includes an encoding device configured to encode a first binary bit value in data into a level that lasts for a first duration, and encode a second binary bit value in the data into a level that lasts for a second duration, where levels are separated by delimiters, and the first duration is unequal to the second duration; and a receive end described above.

Beneficial Effects

The present application uses an encoding mode characterized by higher communication efficiency and a higher recognition ratio, and when performing decoding, can adaptively set parameters at a receive end according to a received optical signal to decode the optical signal. By using this method, optical signals sent by LED lamps of most transmit ends can be received adaptively. When parameters of the optical signals from the transmit end change, the receive end does not need upgrading.

BRIEF DESCRIPTION OF DRAWINGS

To make objectives, features, and advantages of the present application more comprehensible, the following describes specific embodiments of the present application in detail with reference to accompanying drawings.

DESCRIPTION OF EMBODIMENTS

Figure 1:
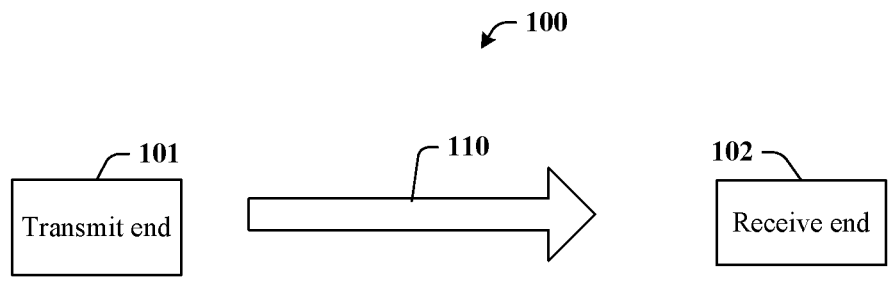
FIG. 1 is a block diagram of an optical communications system according to an embodiment of the present application.

In summary, an optical signal encoding and decoding method is provided in embodiments of the present application, especially a method for encoding and decoding a stroboscopic optical signal sent by an LED lamp of a portable electronic device.

As found in tests on the LED lamp of a portable electronic device, a random delay exists in controlling the flashing of the LED lamp. The delay of flash control makes it difficult to synchronize between a transmit end and a signal end. According to a conventional technology, the LED lamp flashes intermittently at a high frequency to perform communication, in which light represents binary 1 and absence of light represents binary 0. However, for lack of accurate synchronization, error bits are received if light represents binary 1 and absence of light represents binary 0. For example, after a duration of a light absence state that represents one binary bit 0 exceeds a specified value, the state is recognized as another binary bit 0 in a surplus duration.

A block coding mode is used to resolve the problem. That is, in encoding, to-be-sent data may be divided into multiple data units, and each data unit includes one or more bits. Then the data units are converted into multiple electric signal units, and each electric signal unit uses a quantity of level jumps or a quantity of levels to represent bits of a corresponding data unit. A fixed level is used to denote spacing between adjacent electric signal units. A level jump may include only a jump from a low level to a high level, or include only a jump from a low level to a high level, and may include both a jump from a low level to a high level and a jump from a low level to a high level. Levels that denote one bit in an electric signal unit may be all high levels or may be all low levels, but it may be a different case with levels in the electric signal unit.

In this mode, delimitation between electric signal units makes recognition of continuous bits occur in only a single electric signal unit. In this short time, a probability of signal recognition errors caused by a random delay is reduced significantly. Therefore, this mode improves communication reliability.

However, the additional interblock spacing is used only to separate blocks but carries no information, which reduces communication efficiency.

The present application proposes another encoding mode, which uses level durations rather than high or low levels to represent different binary bit values. Specifically, a first binary bit value such as binary 0 is encoded into a level that lasts for a first duration, and a second binary bit value in the data such as binary 1 is encoded into a level that lasts for a second duration, where the first duration is unequal to the second duration. The level that lasts for the first duration and the level that lasts for the second duration may be high levels or low levels. Delimiters are set between the levels to separate the levels.

At the receive end, by comparing the duration of each level with a decision duration, the binary bit value represented by the level can be recognized. In this way, the signal sent by the transmit end can be decoded smoothly even if the transmit end is not synchronized with the receive end.

A further problem is: due to a delay of flash control of an LED lamp, the level duration controlled by the transmit end does not always conform to design. For example, the transmit end may expect a level duration to be 2 ms, but the level duration in the sent signal reaches 5 ms. Therefore, the decision duration needs to tolerate such a deviation. However, due to randomness of the delay at different time and between different terminals, it is difficult to preset an appropriate decision duration. For example, if a preset decision duration is an average value of the first duration and the second duration, a level that should last for the first duration but actually lasts for a longer duration than the average value cannot be recognized accurately. By selecting first duration that is more sharply different from a second duration, the problem can be relieved to some extent, but longer durations reduce communication efficiency.

According to conception of the present application, the duration of each level of the electric signal is recorded when the electric signal is decoded, and then an average value of m maximum durations and an average value of n minimum durations are calculated, where m and n are positive integers and are determined by referring to a distribution percentage value of first binary bit values and a distribution percentage value of second binary bit values in data respectively. Subsequently, a decision duration is calculated according to the first average value and the second average value. Then the duration of each level is compared with the decision duration, and a binary bit value represented by the level is determined according to a comparison result. Finally, the original data is restored by integrating all binary bit values.

The decision duration is determined adaptively by performing statistics of durations, and the receive end can well adapt to various transmit ends. Moreover, because no fixed decision duration needs to be set, the decision duration does not need updating.

With reference to accompanying drawings, the following describes the present application that claims protection. The same reference numeral is used in all accompanying drawings to denote the same part or step. For interpretation, the following discloses details to provide a comprehensive understanding about the subject that claims protection. However, it is apparent that the invention may be implemented without using such details.

First Embodiment

Sending and receiving processes in this embodiment may be implemented on various electronic devices. FIG. 1 is a block diagram of an optical communications system according to an embodiment of the present application. The communications system 100 includes a transmit end 101 and a receive end 102. The transmit end 101 sends an optical signal to the receive end 102. The transmit end 101 may be one of various portable electronic devices. Examples of the portable electronic devices include but are not limited to a mobile phone, a tablet, and a special-purpose communications terminal.

Figure 2:
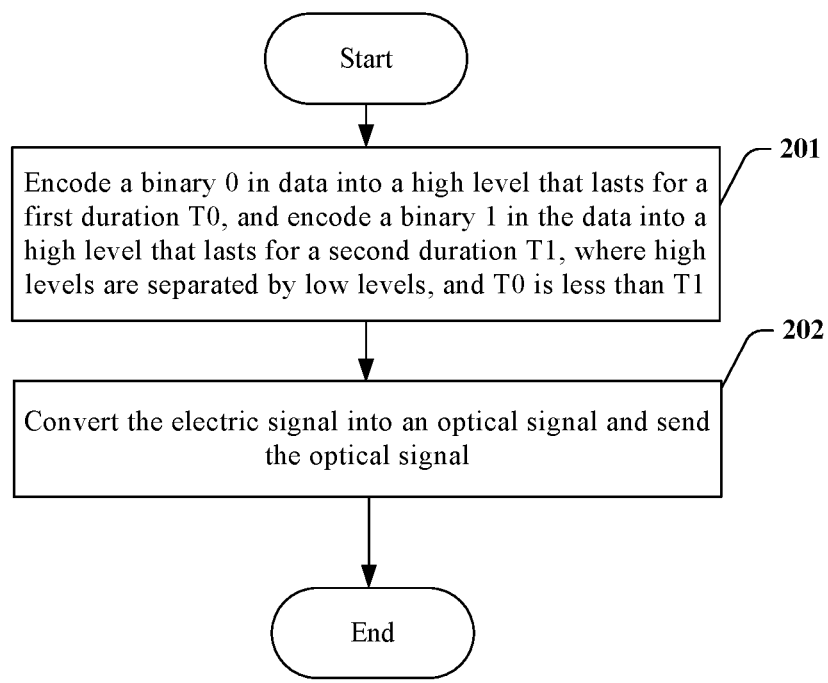
FIG. 2 is a flowchart of encoding and sending an optical signal according to a first embodiment of the present application.

Refer to FIG. 2, which is a flowchart of encoding and sending an optical signal according to a first embodiment of the present application, and the process includes the following steps.

Step 201: Encode to-be-sent data into an electronic signal. Specifically, a binary 0 in the data is encoded into a high level that lasts for first duration T0, and a binary 1 in the data is encoded into a high level that lasts for a second duration T1, where T0 is less than T1. High levels are separated by delimiters, and low levels are used as the delimiters. The to-be-sent data may be a text, picture, audio and/or video.

Figure 4:
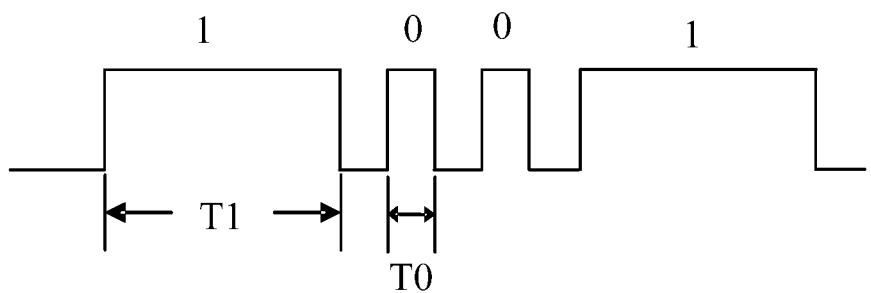
FIG. 4 shows an exemplary encoded electric signal in optical communication according to a first embodiment of the present application.

FIG. 4 is an exemplary encoded electric signal, and shows a relationship between a bit value and a level duration. In the figure, durations of four high levels are T1, T0, T0, and T1 respectively, and represent binary data 1001. For example, T0 is 2 ms, and T1 is 30 ms. A low level between high levels is used as a delimiter, and the delimiter may also be deemed an end flag of a bit. The specified duration of the low level may be relatively short in order to improve communication efficiency.

Step 202: Convert the electric signal into an optical signal and send the optical signal.

The electric signal controls a light emitting diode to send the data in the form of an optical signal.

Understandably, FIG. 4 is an ideal form of encoding an electric signal. When the signal is converted into a visible light signal, the durations of some levels may fluctuate randomly and deviate from the form shown in FIG. 4, which requires the receive end to recognize the signal by decoding.

Figure 3:
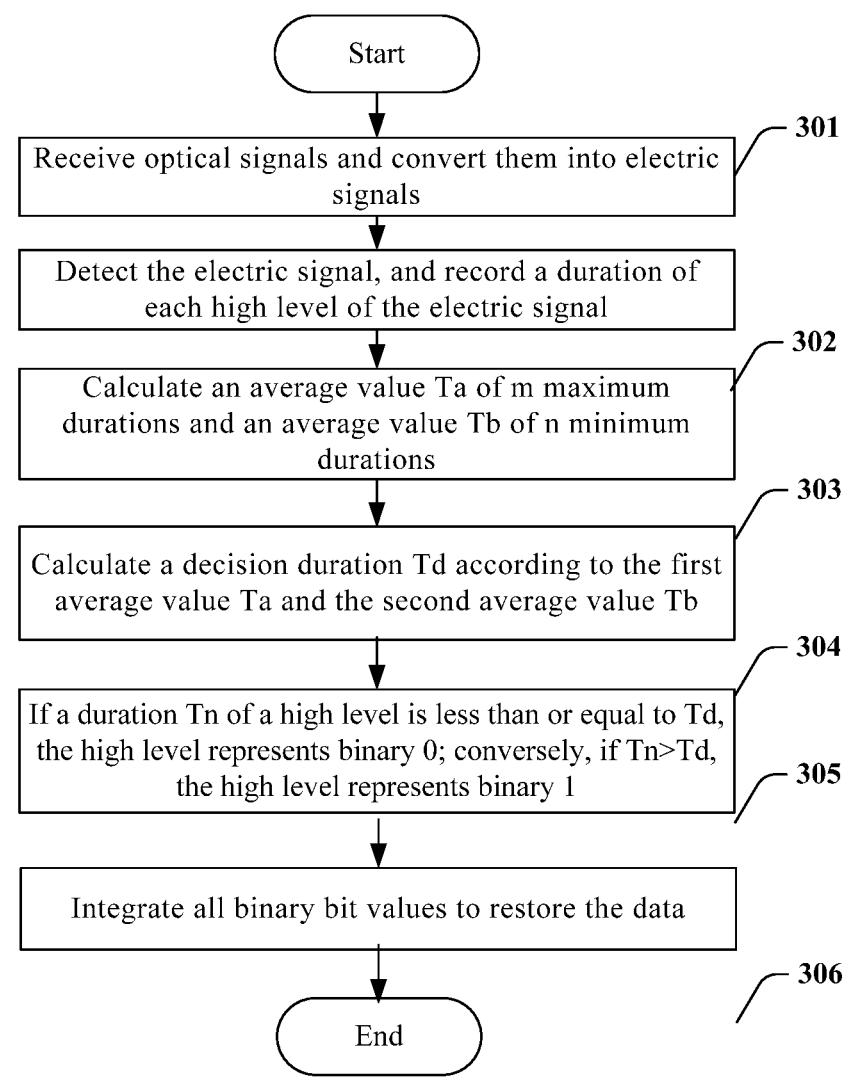
FIG. 3 is a flowchart of receiving and decoding an optical signal according to an embodiment of the present application.

Refer to FIG. 3, which is a flowchart of a method for receiving and decoding an optical signal according to a first embodiment of the present application, and the process includes the following steps.

Step 301: Receive an optical signal and convert the optical signal into an electric signal.

The electric signal is the sent electric signal described above. In the signal, a high level that lasts for first duration T0 represents binary 0, and a high level that lasts for a second duration T1 represents binary 1.

Step 302: Detect the electric signal, and record a duration of each high level of the electric signal.

When a quantity of high levels in the electric signal is relatively small, the durations of all high levels may be detected. If the quantity of high levels is huge, the durations of a part of high levels may be detected. The quantity of this part should be large enough for serving as samples of the entire electric signal.

Step 303: Calculate an average value Ta of m maximum durations and an average value Tb of n minimum durations, where m and n are positive integers and are determined by referring to a distribution percentage value of binary 0 and a distribution percentage value of binary 1 in the data respectively.

Generally, m and n are positive integers greater than or equal to 3. An upper limit of m is the quantity M of high levels that last for about the second duration T1, and an upper limit of n is the quantity N of high levels that last for about the first duration T0. When the total quantity of high levels in the electric signal is limited, M and N may be obtained in the manner.

In a circumstance, the distribution percentage value of binary 0 and the distribution percentage value of binary 1 in the data are predetermined. Therefore, M and N may be obtained by multiplying the quantity P of all high levels by the distribution percentage value of 0 and the distribution percentage value of 1 respectively. In this way, m may be less than or equal to M, and n may be less than or equal to N.

In another circumstance, the distribution percentage value of binary 0 and the distribution percentage value of binary 1 in the data are random. In this circumstance, the distribution percentage value of binary 0 is generally 40%-60%, and so is the distribution percentage of binary 1. In this case, m is less than or equal to 0.4 P, and n is less than or equal to 0.4 P. To leave a margin, m is less than or equal to P/3, and n is less than or equal to P/3.

When the total quantity of high levels in the electric signal is huge, m and n may be selected freely among positive integers greater than or equal to 3, without any risk of exceeding the upper limit.

Step 304: Calculate a decision duration Td according to the first average value Ta and the second average value Tb.

Step 305: Compare the duration of each high level with the decision duration Td, and according to a comparison result, determine a binary bit value represented by the high level. If the duration Tn of a high level is less than or equal to Td, the high level represents binary 0. Conversely, if Tn>Td, the high level represents binary 1.

Step 306: Integrate all binary bit values to restore the data.

Therefore, the encoding performed by using the method in this embodiment improves communication efficiency and keeps a relatively high recognition ratio. In addition, decoding is performed by setting a decision duration adaptively, which prevents the transmit end from setting a universally applicable decision duration and prevents setting a fixed decision duration for the receive end, and avoids the risk of inconvenient upgrade.

Second Embodiment

Sending and receiving processes in this embodiment may be implemented on various electronic devices. The transmit end may be one of various portable electronic devices. Examples of the portable electronic devices include but are not limited to a mobile phone, a tablet, and a special-purpose communications terminal.

Figure 5:
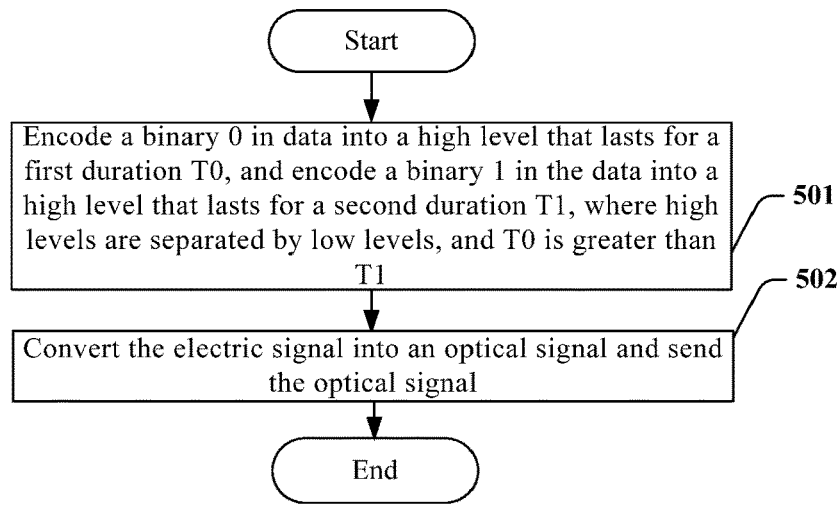
FIG. 5 is a flowchart of encoding and sending an optical signal in optical communication according to a second embodiment of the present application.

Refer to FIG. 5, which is a flowchart of encoding and sending an optical signal according to a second embodiment of the present application, and the process includes the following steps.

Step 501: Encode to-be-sent data into an electronic signal. Specifically, a binary 0 in the data is encoded into a high level that lasts for first duration T0, and a binary 1 in the data is encoded into a high level that lasts for a second duration T1, where T0 is greater than T1. High levels are separated by delimiters, and low levels are used as the delimiters. The to-be-sent data may be a text, picture, audio and/or video.

Figure 7:
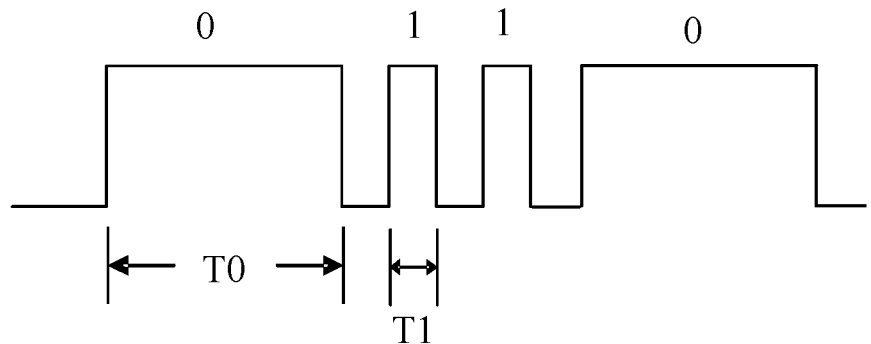
FIG. 7 shows an exemplary encoded electric signal in optical communication according to a second embodiment of the present application.

FIG. 7 is an exemplary encoded electric signal, and shows a relationship between a bit value and a level duration. In the figure, durations of four high levels are T1, T0, T0, and T1 respectively, and represent binary data 0110. For example, T0 is 30 ms, and T1 is 2 ms. A low level between high levels is used as a delimiter, and the delimiter may also be deemed an end flag of a bit. The specified duration of the low level may be relatively short in order to improve communication efficiency.

Step 502: Convert the electric signal into an optical signal and send the optical signal.

The electric signal controls a light emitting diode to send the data in the form of an optical signal.

Understandably, FIG. 7 is an ideal form of encoding an electric signal. When the signal is converted into a visible light signal, the durations of some levels may fluctuate randomly and deviate from the form shown in FIG. 7, which requires the receive end to recognize the signal by decoding.

Figure 6:
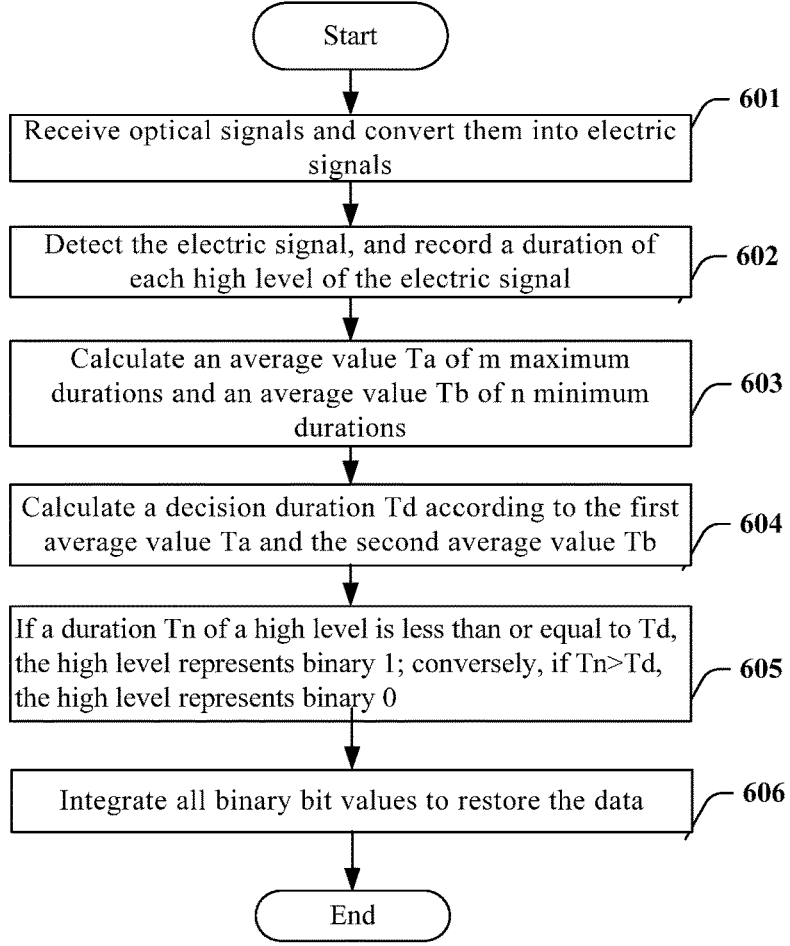
FIG. 6 is a flowchart of receiving and decoding an optical signal in optical communication according to a second embodiment of the present application.

Refer to FIG. 6, which is a flowchart of a method for receiving and decoding an optical signal according to a second embodiment of the present application, and the process includes the following steps.

Step 601: Receive an optical signal and convert the optical signal into an electric signal.

The electric signal is the sent electric signal described above. In the signal, a high level that lasts for first duration T1 represents binary 0, and a high level that lasts for a second duration T1 represents binary 1.

Step 602: Detect the electric signal, and record a duration of each high level of the electric signal.

When a quantity of high levels in the electric signal is relatively small, the durations of all high levels may be detected. If the quantity of high levels is huge, the durations of a part of high levels may be detected. The quantity of this part should be large enough for serving as samples of the entire electric signal.

Step 603: Calculate an average value Ta of m maximum durations and an average value Tb of n minimum durations, where m and n are positive integers and are determined by referring to a distribution percentage value of binary 0 and a distribution percentage value of binary 1 in the data respectively.

Generally, m and n are positive integers greater than or equal to 3. An upper limit of m is the quantity M of high levels that last for about the second duration T1, and an upper limit of n is the quantity N of high levels that last for about the first duration T0. When the total quantity of high levels in the electric signal is limited, M and N may be obtained in the manner.

In a circumstance, the distribution percentage value of binary 0 and the distribution percentage value of binary 1 in the data are predetermined. Therefore, M and N may be obtained by multiplying the quantity P of all high levels by the distribution percentage value of 0 and the distribution percentage value of 1 respectively. In this way, m may be less than or equal to M, and n may be less than or equal to N.

In another circumstance, the distribution percentage value of binary 0 and the distribution percentage value of binary 1 in the data are random. In this circumstance, the distribution percentage value of binary 0 is generally 40%-60%, and so is the distribution percentage of binary 1. In this case, m is less than or equal to 0.4 P, and n is less than or equal to 0.4 P. To leave a margin, m is less than or equal to P/3, and n is less than or equal to P/3.

When the total quantity of high levels in the electric signal is huge, m and n may be selected freely among positive integers greater than or equal to 3, without any risk of exceeding the upper limit.

Step 304: Calculate a decision duration Td according to the first average value Ta and the second average value Ta.

Step 305: Compare the duration of each high level with the decision duration Td, and according to a comparison result, determine a binary bit value represented by the high level.

If the duration Tn of a high level is less than or equal to Td, the high level represents binary 1. Conversely, if Tn>Td, the high level represents binary 0.

Step 306: Integrate all binary bit values to restore the data.

Therefore, the encoding performed by using the method in this embodiment improves communication efficiency and keeps a relatively high recognition ratio. In addition, decoding is performed by setting a decision duration adaptively, which prevents the transmit end from setting a universally applicable decision duration and prevents setting a fixed decision duration for the receive end, and avoids the risk of inconvenient upgrade.

Third Embodiment

Sending and receiving processes in this embodiment may be implemented on various electronic devices. The transmit end may be one of various portable electronic devices. Examples of the portable electronic devices include but are not limited to a mobile phone, a tablet, and a special-purpose communications terminal.

Figure 8:
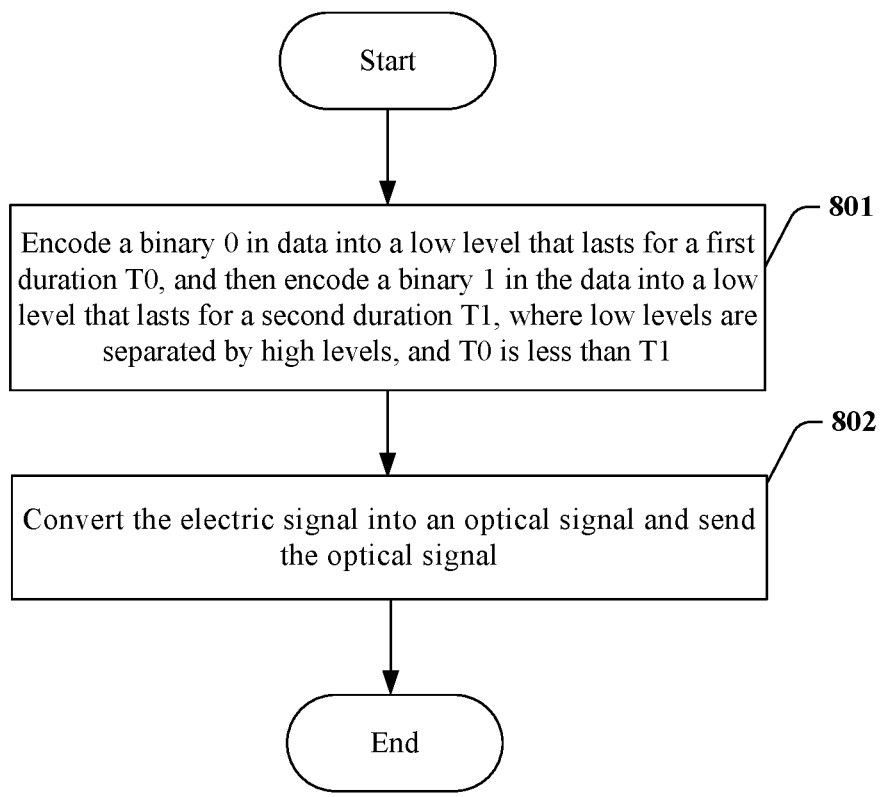
FIG. 8 is a flowchart of encoding and sending an optical signal in optical communication according to a third embodiment of the present application.

Refer to FIG. 8, which is a flowchart of encoding and sending an optical signal according to a third embodiment of the present application, and the process includes the following steps.

Step 801: Encode to-be-sent data into an electronic signal. Specifically, a binary 0 in the data is encoded into a low level that lasts for first duration T0, and a binary 1 in the data is encoded into a low level that lasts for a second duration T1, where T0 is less than T1. Low levels are separated by delimiters, and high levels are used as the delimiters. The to-be-sent data may be a text, picture, audio and/or video.

Figure 10:
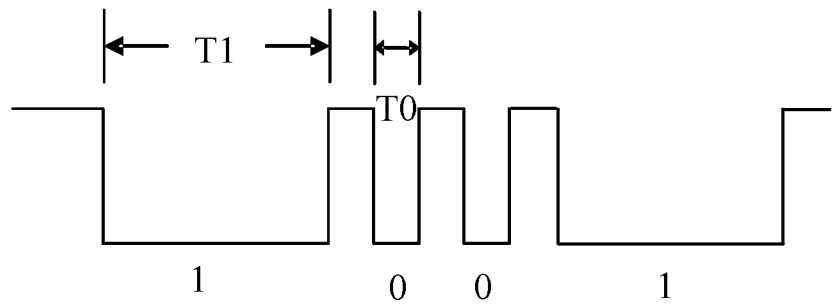
FIG. 10 shows an exemplary encoded electric signal in optical communication according to a third embodiment of the present application.

FIG. 10 is an exemplary encoded electric signal, and shows a relationship between a bit value and a low level duration. In the figure, durations of four low levels are T1, T0, T0, and T1 respectively, and represent binary data 1001. For example, T0 is 2 ms, and T1 is 30 ms. A high level between low levels is used as a delimiter, and the delimiter may also be deemed an end flag of a bit. The specified duration of the high level may be relatively short in order to improve communication efficiency.

Step 802: Convert the electric signal into an optical signal and send the optical signal.

The electric signal controls a light emitting diode to send the data in the form of an optical signal.

Understandably, FIG. 10 is an ideal form of encoding an electric signal. When the signal is converted into a visible light signal, the durations of some levels may fluctuate randomly and deviate from the form shown in FIG. 4, which requires the receive end to recognize the signal by decoding.

Figure 9:
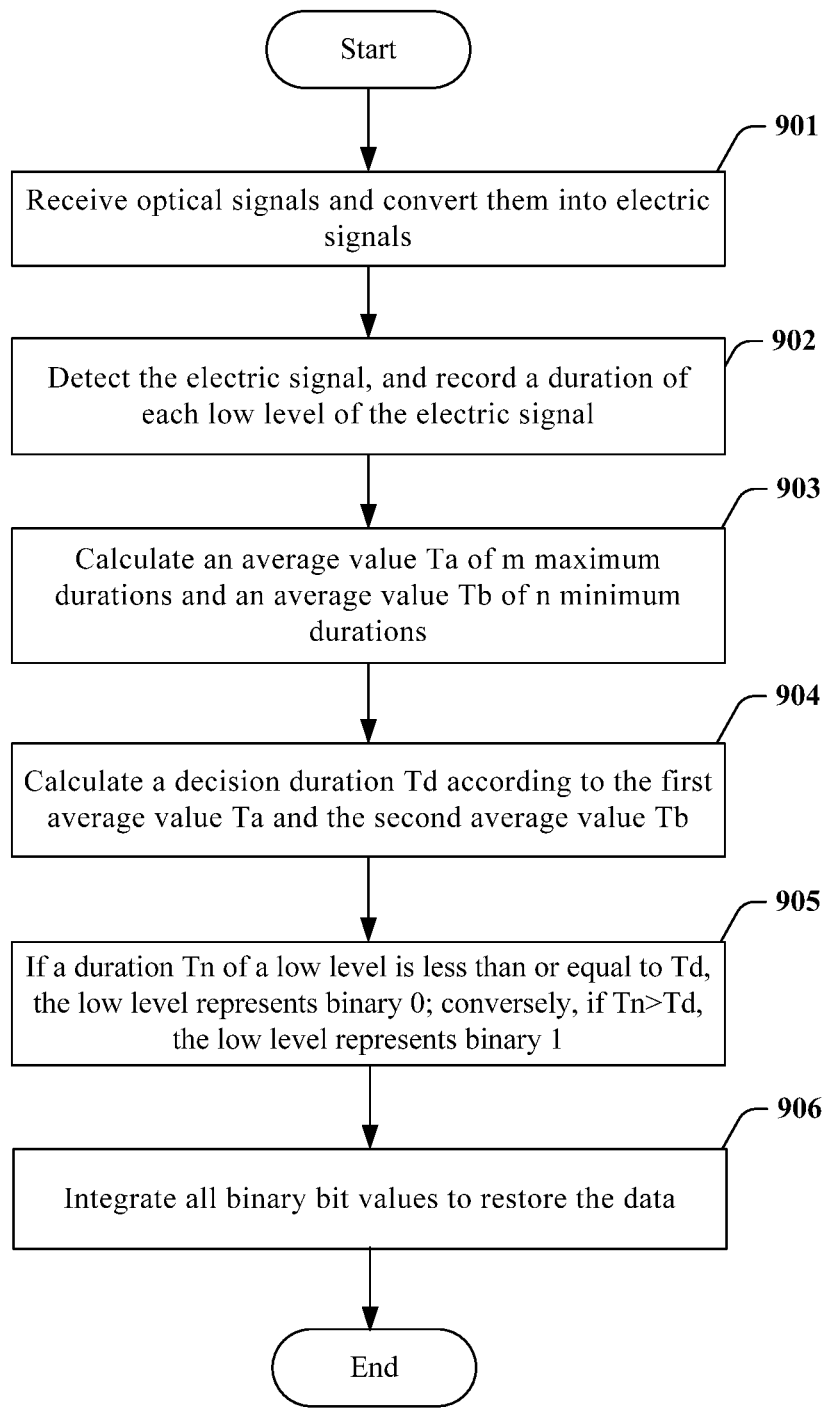
FIG. 9 is a flowchart of receiving and decoding an optical signal in optical communication according to a third embodiment of the present application.

Refer to FIG. 9, which is a flowchart of a method for receiving and decoding an optical signal according to a third embodiment of the present application, and the process includes the following steps.

Step 901: Receive an optical signal and convert the optical signal into an electric signal.

The electric signal is the sent electric signal described above. In the signal, a low level that lasts for first duration T0 represents binary 0, and a low level that lasts for a second duration T1 represents binary 1.

Step 902: Detect the electric signal, and record a duration of each low level of the electric signal.

When a quantity of low levels in the electric signal is relatively small, the durations of all low levels may be detected. If the quantity of low levels is huge, the durations of a part of low levels may be detected. The quantity of this part should be large enough for serving as samples of the entire electric signal.

Step 903: Calculate an average value Ta of m maximum durations and an average value Tb of n minimum durations, where m and n are positive integers and are determined by referring to a distribution percentage value of binary 0 and a distribution percentage value of binary 1 in the data respectively.

Generally, m and n are positive integers greater than or equal to 3. An upper limit of m is the quantity M of low levels that last for about the second duration T1, and an upper limit of n is the quantity N of low levels that last for about the first duration T0. When the total quantity of low levels in the electric signal is limited, M and N may be obtained in the manner.

In a circumstance, the distribution percentage value of binary 0 and the distribution percentage value of binary 1 in the data are predetermined. Therefore, M and N may be obtained by multiplying the quantity P of all low levels by the distribution percentage value of 0 and the distribution percentage value of 1 respectively. In this way, m may be less than or equal to M, and n may be less than or equal to N.

In another circumstance, the distribution percentage value of binary 0 and the distribution percentage value of binary 1 in the data are random. In this circumstance, the distribution percentage value of binary 0 is generally 40%-60%, and so is the distribution percentage of binary 1. In this case, m is less than or equal to 0.4 P, and n is less than or equal to 0.4 P. To leave a margin, m is less than or equal to P/3, and n is less than or equal to P/3.

When the total quantity of low levels in the electric signal is huge, m and n may be selected freely among positive integers greater than or equal to 3, without any risk of exceeding the upper limit.

Step 904: Calculate a decision duration Td according to the first average value Ta and the second average value Ta.

Step 905: Compare the duration of each low level with the decision duration Td, and according to a comparison result, determine a binary bit value represented by the low level. If the duration Tn of a low level is less than or equal to Td, the low level represents binary 0. Conversely, if Tn>Td, the low level represents binary 1.

Step 906: Integrate all binary bit values to restore the data.

Therefore, the encoding performed by using the method in this embodiment improves communication efficiency and keeps a relatively high recognition ratio. In addition, decoding is performed by setting a decision duration adaptively, which prevents the transmit end from setting a universally applicable decision duration and prevents setting a fixed decision duration for the receive end, and avoids the risk of inconvenient upgrade.

Embodiment 4

Sending and receiving processes in this embodiment may be implemented on various electronic devices. The transmit end may be one of various portable electronic devices. Examples of the portable electronic devices include but are not limited to a mobile phone, a tablet, and a special-purpose communications terminal.

Figure 11:
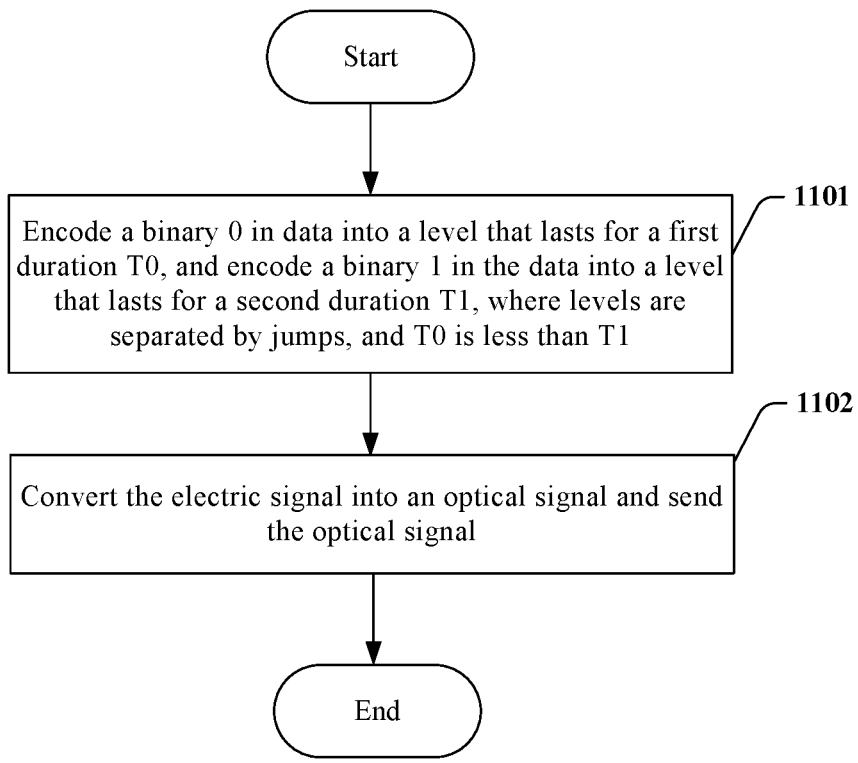
FIG. 11 is a flowchart of encoding and sending an optical signal according to a fourth embodiment of the present application.

Refer to FIG. 11, which is a flowchart of encoding and sending an optical signal according to a fourth embodiment of the present application, and the process includes the following steps.

Step 1101: Encode to-be-sent data into an electronic signal. Specifically, a binary 0 in the data is encoded into a level that lasts for first duration T0, and a binary 1 in the data is encoded into a level that lasts for a second duration T1, where T0 is less than T1. The level that represents binary 0 may be a high level or a low level, and the level that represents binary 1 may be a high level or a low level. A jump is used as a delimiter between levels. The to-be-sent data may be a text, picture, audio and/or video.

Figure 13:
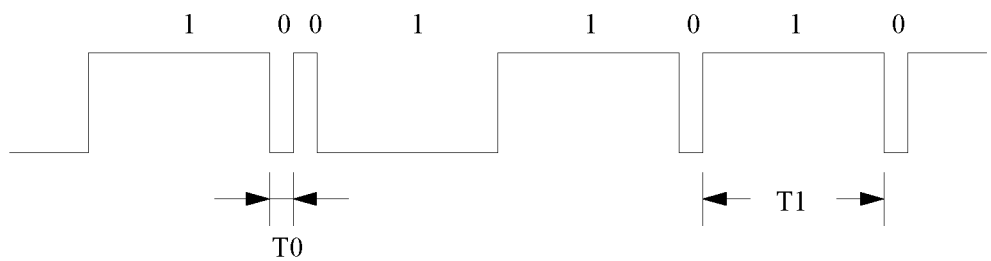
FIG. 13 shows an exemplary encoded electric signal in optical communication according to a fourth embodiment of the present application.

FIG. 13 is an exemplary encoded electric signal, and shows a relationship between a bit value and a level duration. In the figure, durations of 8 levels are T1, T0, T0, T1, T1, T0, T1, and T1 respectively, and represent binary data 10011010. For example, T0 is 2 ms, and T1 is 30 ms. Adjacent levels that represent different binary values are always different. That is, the levels are separated by jumps. Therefore, the low level in the preceding embodiment does not need to be used to separate the levels that represent the binary values.

Step 202: Convert the electric signal into an optical signal and send the optical signal.

The electric signal controls a light emitting diode to send the data in the form of an optical signal.

Understandably, FIG. 13 is an ideal form of encoding an electric signal. When the signal is converted into a visible light signal, the durations of some levels may fluctuate randomly and deviate from the form shown in FIG. 13, which requires the receive end to recognize the signal by decoding.

Figure 12:
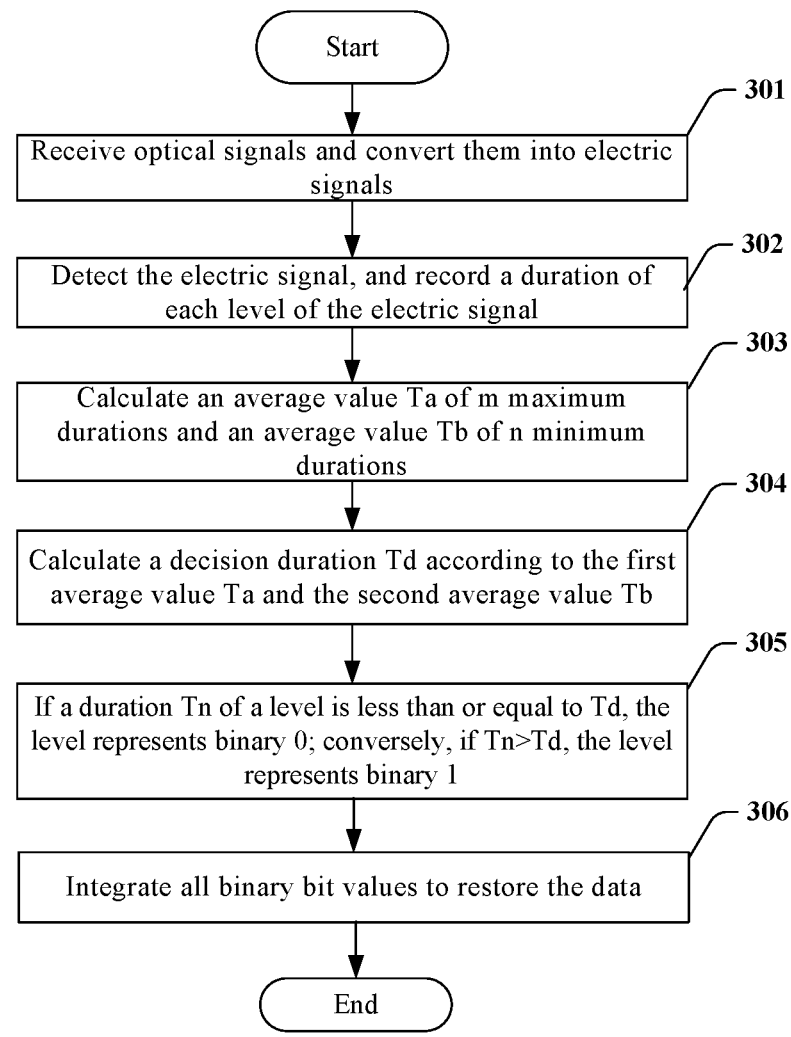
FIG. 12 is a flowchart of a method for receiving and decoding an optical signal according to a fourth embodiment of the present application.

Refer to FIG. 12, which is a flowchart of a method for receiving and decoding an optical signal according to a fourth embodiment of the present application, and the process includes the following steps.

Step 1201: Receive an optical signal and convert the optical signal into an electric signal.

The electric signal is the sent electric signal described above. In the signal, a level that lasts for first duration T0 represents binary 0, and a level that lasts for a second duration T1 represents binary 1.

Step 1202: Detect the electric signal, and record a duration of each level of the electric signal.

When a quantity of levels in the electric signal is relatively small, the durations of all levels may be detected. If the quantity of levels is huge, the durations of a part of levels may be detected. The quantity of this part should be large enough for serving as samples of the entire electric signal.

Step 1203: Calculate an average value Ta of m maximum durations and an average value Tb of n minimum durations, where m and n are positive integers and are determined by referring to a distribution percentage value of binary 0 and a distribution percentage value of binary 1 in the data respectively.

Generally, m and n are positive integers greater than or equal to 3. An upper limit of m is the quantity M of levels that last for about the second duration T1, and an upper limit of n is the quantity N of levels that last for about the first duration T0. When the total quantity of levels in the electric signal is limited, M and N may be obtained in the manner.

In a circumstance, the distribution percentage value of binary 0 and the distribution percentage value of binary 1 in the data are predetermined. Therefore, M and N may be obtained by multiplying the quantity P of all levels by the distribution percentage value of 0 and the distribution percentage value of 1 respectively. In this way, m may be less than or equal to M, and n may be less than or equal to N.

In another circumstance, the distribution percentage value of binary 0 and the distribution percentage value of binary 1 in the data are random. In this circumstance, the distribution percentage value of binary 0 is generally 40%-60%, and so is the distribution percentage of binary 1. In this case, m is less than or equal to 0.4 P, and n is less than or equal to 0.4 P. To leave a margin, m is less than or equal to P/3, and n is less than or equal to P/3.

When the total quantity of levels in the electric signal is huge, m and n may be selected freely among positive integers greater than or equal to 3, without any risk of exceeding the upper limit.

Step 304: Calculate a decision duration Td according to the first average value Ta and the second average value Ta.

Step 305: Compare the duration of each level with the decision duration Td, and according to a comparison result, determine a binary bit value represented by the level. If the duration Tn of a level is less than or equal to Td, the level represents binary 0. Conversely, if Tn>Td, the level represents binary 1.

Step 306: Integrate all binary bit values to restore the data.

Therefore, the encoding performed by using the method in this embodiment improves communication efficiency and keeps a relatively high recognition ratio. In addition, decoding is performed by setting a decision duration adaptively, which prevents the transmit end from setting a universally applicable decision duration and prevents setting a fixed decision duration for the receive end, and avoids the risk of inconvenient upgrade. In addition, compared with the first to third embodiments, the transmission time in this embodiment can be shortened because the reference level that lasts for a specific duration is no longer used as a delimiter.

It can be seen that in the first to fourth embodiments, the first duration T0 may be sharply different from the second duration T1. For example, T1 is 2 ms, and T1 is 30 ms. Therefore, if the quantity of levels that last for T1 is greater than the quantity of levels that last for T0 in a transmitted signal, the overall transmission time of the signal increases significantly. Therefore, in a preferred embodiment, the following judgment may be made beforehand: when the quantity of binary values 1 (denoted by a level that lasts for T1) to be transmitted is greater than the binary values 0 (denoted by a level that lasts for T0), an overall value reverse may be performed. That is, binary values 1 and binary values 0 are interchanged. For example, data 101111001 is reversed to 010000110.

The reverse may not necessarily performed for the data as a whole, but may be performed for a segment of the data. For example, the to-be-sent data is divided into multiple segments (for example, when a 27-bit data needs to be transmitted, the data is divided into three segments, and each segment has 9 binary values). The judgment step is performed for each segment separately, and the segment that needs reversing is reversed.

By means of the reversing, the transmission time is further shortened.

The present application further proposes a signal decoding device, which is configured to decode an electric signal converted from a wireless signal, where the decoding device includes:

a module configured to record a duration of each level of the electric signal;

a module configured to calculate an average value of m maximum durations and an average value of n minimum durations, where m and n are positive integers and are determined by referring to a distribution percentage value of first binary bit values and a distribution percentage value of second binary bit values in the data respectively;

a module configured to calculate a decision duration according to the first average value and the second average value;

a module configured to compare the duration of each level with the decision duration, and according to a comparison result, determine a binary bit value represented by the level; and a module configured to integrate all binary bit values to restore the data represented by the electric signal.

The present application further proposes a receive end, including a decoding device described above.

The present application further proposes a communications system, including a transmit end and a receive end. The transmit end includes an encoding device configured to encode a first binary bit value in data into a level that lasts for first duration, and encode a second binary bit value in the data into a level that lasts for a second duration, where the first duration is unequal to the second duration. The receive end is the receive end described above.

In the optical signal encoding and decoding methods, device and system proposed in the present application, an encoding mode characterized by higher communication efficiency and a higher recognition ratio is used, and in decoding, parameters at a receive end can be set adaptively according to a received optical signal to decode the optical signal. By using this method, optical signals sent by LED lamps of most transmit ends can be received adaptively. When parameters of the optical signals from the transmit end change, the receive end does not need upgrading.

Although the foregoing embodiments use an optical signal to describe the present application, but it is understandable that the present application may also be implemented by using an acoustic signal. The acoustic signal may be an infrasonic signal, an audible wave signal, or an ultrasonic signal. Therefore, the embodiments of the present application are applicable to various wireless signals such as the optical signal and the acoustic signal.

Although the present application is described in detail with reference to specific embodiments, a person of ordinary skill in the art should understand that the foregoing embodiments are intended for describing the present application only, and that various equivalent changes or replacements may be made without departing from the spirit of the present application. Therefore, all changes or variations made to the foregoing embodiments without departing from the spirit of the present application shall still fall within the scope of the claims of the present application.

What is claimed is:

1. A wireless signal encoding and decoding method, comprising the following steps:
   encoding, at a transmit end, a first binary bit value in data into a level that lasts for a first duration, and encoding a second binary bit value in the data into a level that lasts for a second duration, levels are separated by delimiters, and the first duration is unequal to the second duration;
   converting encoded data levels into a wireless optical signal at the transmit end;
   receiving the wireless optical signal at a receive end, and converting the wireless optical signal into an electric signal;
   decoding the electric signal at the receive end in the following manner:
   recording a duration of each level of the electric signal;
   calculating a first average value Ta of m maximum durations and a second average value Tb of n minimum durations, the m and n are positive integers and are determined by referring to a distribution percentage value of first binary bit values and a distribution percentage value of second binary bit values in the data respectively;
   calculating a decision duration Td according to the first average value and the second average value;
   comparing the duration of each level with the decision duration, and according to a comparison result, determining a binary bit value represented by the level; and
   integrating all binary bit values to restore the data.

2. The method according to claim 1, wherein the level that lasts for the first duration and the level that lasts for the second duration are characteristic levels, and delimiters between reference levels are reference levels different from the characteristic levels.

3. The method according to claim 1, wherein the delimiters between the levels are level jumps.

4. The method according to claim 2, further comprising: interchanging the first binary bit value and the second binary bit value if a quantity of the first binary bit values is greater than a quantity of the second binary bit values in the data when the first duration is greater than the second duration; or, interchanging the first binary bit value and the second binary bit value if a quantity of the second binary bit values is greater than a quantity of the first binary bit values in the data when the second duration is greater than the first duration.

5. The method according to claim 2, further comprising: interchanging the first binary bit value and the second binary bit value in a segment of the data if a quantity of the first binary bit values is greater than a quantity of the second binary bit values in the segment of the data when the first duration is greater than the second duration; or, interchanging the first binary bit value and the second binary bit value in a segment of the data if a quantity of the second binary bit values is greater than a quantity of the first binary bit values in the segment of data when the second duration is greater than the first duration.

6. The method according to claim 1, wherein the distribution percentage value of the first binary bit values and the distribution percentage value of the second binary bit values in the data are predetermined, m is less than or equal to a product of a total quantity of the levels and the distribution percentage value of the first binary bit values, and n is less than or equal to a product of the total quantity of the levels and the distribution percentage value of the second binary bit values.

7. The method according to claim 1, wherein the distribution percentage value of the first binary bit values and the distribution percentage value of the second binary bit values in the data are random.

8. The method according to claim 7, wherein m is less than or equal to P/3, and n is less than or equal to P/3, P is a total quantity of levels in the signal, and both m and n are greater than or equal to 3.

9. The method according to claim 1, wherein the step of determining, according to a comparison result, a binary bit value represented by the level comprises:
   when the first duration is less than the second duration, if a duration of a level is less than or equal to the decision duration, the level represents the first binary bit value, or, if a duration of a level is greater than the decision duration, the level represents the second binary bit value; and
   when the first duration is greater than the second duration, if a duration of a level is less than or equal to the decision duration, the level represents the second binary bit value, or, if a duration of a level is greater than the decision duration, the level represents the first binary bit value.

10. The method according to claim 1, wherein the wireless optical signal comprises at least one of an infrared optical signal, a visible light signal, and an ultraviolet light signal.

11. The method according to claim 1, wherein a relationship between the decision duration Td and the first average value Ta and the second average value Tb is: $Td=(Ta+Tb)/2$.

12. A wireless signal decoding method, which is used to decode an electric signal converted from a wireless optical signal, wherein the decoding method comprises the following steps:
   receiving, by an electronic device, a wireless optical signal and converting the wireless optical signal into the electric signal;
   detecting, by the electronic device, the electric signal, and recording a duration of each level of the electric signal;

calculating, by the electronic device, a first average value Ta of m maximum durations and a second average value Tb of n minimum durations, the m and n are positive integers and are determined by referring to a distribution percentage value of first binary bit values and a distribution percentage value of second binary bit values in the data respectively;

calculating, by the electronic device, a decision duration Td according to the first average value and the second average value;

comparing, by the electronic device, the duration of each level with the decision duration, and according to a comparison result, determining a binary bit value represented by the level; and integrating, by the electronic device, all binary bit values to restore the data represented by the electric signal.

13. The method according to claim 12, wherein the distribution percentage value of the first binary bit values and the distribution percentage value of the second binary bit values in the data are predetermined, m is less than or equal to a product of a total quantity of the levels and the distribution percentage value of the first binary bit values, and n is less than or equal to a product of the total quantity of the levels and the distribution percentage value of the second binary bit values.

14. The method according to claim 12, wherein the distribution percentage value of the first binary bit values and the distribution percentage value of the second binary bit values in the data are random.

15. The method according to claim 14, wherein m is less than or equal to P/3, and/or n is less than or equal to P/3, P is a total quantity of levels in the electric signal, and both m and n are greater than or equal to 3.

16. The method according to claim 12, wherein the step of determining, by the electronic device, according to a comparison result, a binary bit value represented by the level comprises:

when the first duration is less than the second duration, if a duration of a level is less than or equal to the decision duration, the level represents the first binary bit value, or, if a duration of a level is greater than the decision duration, the level represents the second binary bit value; and when the first duration is greater than the second duration, if a duration of a level is less than or equal to the decision duration, the level represents the second binary bit value, or, if a duration of a level is greater than the decision duration, the level represents the first binary bit value.

17. The method according to claim 15, wherein a relationship between the decision duration Td and the first average value Ta and the second average value Tb is: Td=(Ta+Tb)/2.

* * * * *